United States Patent
Ide

(10) Patent No.: US 10,693,185 B2
(45) Date of Patent: Jun. 23, 2020

(54) SOLID ELECTROLYTE MATERIAL AND FLUORIDE ION BATTERY

(71) Applicant: TOYOTA JIDOSHA KABUSHIKI KAISHA, Toyota-shi, Aichi-ken (JP)

(72) Inventor: Kazuto Ide, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 357 days.

(21) Appl. No.: 15/795,972

(22) Filed: Oct. 27, 2017

(65) Prior Publication Data
US 2018/0151912 A1 May 31, 2018

(30) Foreign Application Priority Data

Nov. 30, 2016 (JP) ................. 2016-232059
Jul. 19, 2017 (JP) ................. 2017-139807

(51) Int. Cl.
| | | |
|---|---|---|
| H01M 10/0562 | (2010.01) | |
| C01G 29/00 | (2006.01) | |
| H01M 10/05 | (2010.01) | |
| H01B 1/06 | (2006.01) | |
| H01M 10/36 | (2010.01) | |

(52) U.S. Cl.
CPC ...... *H01M 10/0562* (2013.01); *C01G 29/006* (2013.01); *H01B 1/06* (2013.01); *H01M 10/05* (2013.01); *H01M 10/36* (2013.01); *C01P 2002/72* (2013.01); *C01P 2002/76* (2013.01); *H01M 2300/0065* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 5,134,042 A | * | 7/1992 | Madou | B01J 23/002 |
| | | | | 204/426 |
| 8,039,149 B2 | * | 10/2011 | Amatucci | B82Y 30/00 |
| | | | | 423/462 |
| 2007/0243466 A1 | * | 10/2007 | Amatucci | B82Y 30/00 |
| | | | | 429/218.1 |
| 2016/0365614 A1 | * | 12/2016 | Uhlenbruck | H01M 4/368 |
| 2018/0342763 A1 | * | 11/2018 | Miki | H01M 10/0562 |

OTHER PUBLICATIONS

Carine Rongeat, et al., "Solid Electrolytes for Fluoride Ion Batteries: Ionic Conductivity in Polycrystalline Tysonite-Type Fluorides", American Chemical Society Publications, 2014, pp. 2103-2110, vol. 6.

(Continued)

*Primary Examiner* — Rena Dye Cronin
(74) *Attorney, Agent, or Firm* — Sughrue Mion, PLLC

(57) ABSTRACT

An object of the present disclosure is to provide a solid electrolyte material with excellent fluoride ion conductivity. The present disclosure achieves the object by providing a solid electrolyte material to be used for a fluoride ion battery, the solid electrolyte material comprising: a composition of $Bi_xM_{1-x}F_{2+x}$, in which $0.4 \leq x \leq 0.9$, and M is at least one kind of Sn, Ca, Sr, Ba, and Pb; and a crystal phase that has a Tysonite structure.

4 Claims, 4 Drawing Sheets

(56) References Cited

OTHER PUBLICATIONS

J.L. Soubeyroux et al., "Neutron diffraction investigation of the $Ba_{1-x}Bi_xF_{2+x}$ solid solution", Solid State Communications, vol. 82, No. 2, 1992, p. 63-70, ( 8 pages total).
J.M. Réau et al., "Optimisation des facteurs influencant la conductivité anionique dans quelques fluorures de structure fluorine", Journal of Solid State Chemistry, vol. 55, 1984, pp. 7-13 (7 pages total).

* cited by examiner $Bi_xSn_{1-x}F_{2+x}$ ($P6_3/mmc$)

$LaF_3$ ($P\bar{3}c1$)

SOLID ELECTROLYTE MATERIAL AND FLUORIDE ION BATTERY

TECHNICAL FIELD

The present disclosure relates to a solid electrolyte material with high fluoride ion conductivity.

BACKGROUND ART

As high-voltage and high-energy density batteries, for example, Li ion batteries are known. The Li ion battery is a cation-based battery utilizing a reaction between a Li ion and a cathode active material and a reaction between a Li ion and an anode active material. Meanwhile, as anion-based batteries, fluoride ion batteries utilizing a reaction of fluoride ions are known.

Solid electrolyte materials used in fluoride ion batteries are known. For example, Non Patent Literature 1 discloses that $La_{1-y}Ba_yF_{3-y}$ (0≤y≤0.15) having a Tysonite-type structure has fluoride ion conductivity.

CITATION LIST

Non-Patent Literature

Non-Patent Literature 1: Carine Rongeat et al., "Solid Electrolytes for Fluoride Ion Batteries: Ionic Conductivity in Polycrystalline Tysonite-Type Fluorides", ACS Appl. Mater. Interfaces 2014, 6, 2103-2110

SUMMARY OF DISCLOSURE

Technical Problem

From the view point of improving the performance of a fluoride ion battery, there is a need for a solid electrolyte material with high fluoride ion conductivity. The present disclosure has been made in view of the above circumstances, and a main object thereof is to provide a solid electrolyte material with high fluoride ion conductivity.

Solution to Problem

In order to achieve the object, the present disclosure provides a solid electrolyte material to be used for a fluoride ion battery, the solid electrolyte material comprising: a composition of $Bi_xM_{1-x}F_{2+x}$, in which 0.4≤x≤0.9, and M is at least one kind of Sn, Ca, Sr, Ba, and Pb; and a crystal phase that has a Tysonite structure.

According to the present disclosure, inclusion of the specific composition and crystal phase allows a solid electrolyte material to have high fluoride ion conductivity.

In the disclosure, it is preferable that the x satisfies 0.6≤x≤0.9. The reason therefor is that thereby the crystal phase having a Tysonite-type structure may be easily obtained in a single phase so that the fluoride ion conductivity may be further improved.

Also, the present disclosure provides a fluoride ion battery comprising: a cathode layer, an anode layer, and a solid electrolyte layer formed between the cathode layer and the anode layer; wherein at least one of the cathode layer, the anode layer, and the solid electrolyte layer contains the above described solid electrolyte material.

According to the present disclosure, at least one of the cathode layer, the anode layer, and the solid electrolyte layer contains the above described solid electrolyte material, so as to allow a fluoride ion battery to have, for example, high output.

Advantageous Effects of Disclosure

The solid electrolyte material of the present disclosure exhibits effects such as high fluoride ion conductivity.

DESCRIPTION OF EMBODIMENTS

Figure 1:
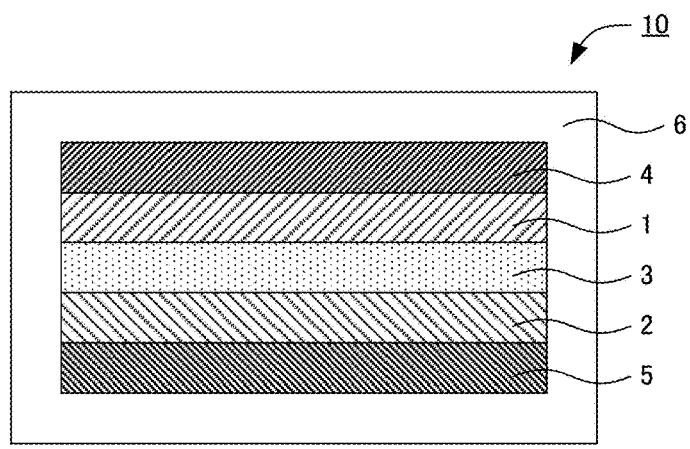
FIG. 1 is a schematic cross-sectional view illustrating an example of the fluoride ion battery of the present disclosure.

The solid electrolyte material and the fluoride ion battery of the present disclosure are hereinafter described in detail.

A. Solid Electrolyte Material

The solid electrolyte material of the present disclosure is a solid electrolyte material to be used for a fluoride ion battery, the solid electrolyte material comprising: a composition of $Bi_xM_{1-x}F_{2+x}$, in which 0.4≤x≤0.9, and M is at least one kind of Sn, Ca, Sr, Ba, and Pb; and a crystal phase that has a Tysonite structure.

According to the present disclosure, inclusion of the specific composition and crystal phase allows a solid electrolyte material to have high fluoride ion conductivity. Also, the solid electrolyte material of the present disclosure is a novel material that has not been conventionally known.

Also, as shown in the later described Examples, the solid electrolyte material of the present disclosure has high fluoride ion conductivity of $10^{-6}$ S/cm or more at a room temperature, even in a state of powder compression molded body. This value is approximately one digit (approximately 10 times) higher than the fluoride ion conductivity of $La_{1-y}Ba_yF_{3-y}$ described in Non-Patent Literature 1. The reason why such high fluoride ion conductivity may be obtained is that, as described later, the crystal phase presumably has a crystal structure with high symmetry.

Also, $PbSnF_4$ has high fluoride ion conductivity. However, this solid electrolyte material contains a Pb element, so that the load for the environment may possibly be large. In contrast, regarding the solid electrolyte material of the present disclosure, for example, when the element other than Pb is selected as M, the load for the environment is small. In other words, the solid electrolyte material of the present disclosure has advantages of small load for the environment in addition to high fluoride ion conductivity, for example, when the element other than Pb is selected as M.

The solid electrolyte material of the present disclosure is typically a fluoride solid solution that contains a Bi element, an M element (M is at least one kind of Sn, Ca, Sr, Ba, and Pb), and an F element. Further, the solid electrolyte material of the present disclosure has a composition of $Bi_xM_{1-x}F_{2+x}$, in which $0.4 \leq x \leq 0.9$.

Here, "having a composition of $Bi_xM_{1-x}F_{2+x}$, in which $0.4 \leq x \leq 0.9$" means both of when the solid electrolyte material contains only a Bi element, an M element, and an F element in the composition of $Bi_xM_{1-x}F_{2+x}$, in which $0.4 \leq x \leq 0.9$, and when the solid electrolyte material further contains additional element. In the latter case, the total proportion of the Bi element, the M element, and the F element with respect to all the elements included in the solid electrolyte material is, preferably 90 mol % or more, and more preferably 95 mol % or more. Incidentally, additional element is not limited if it is other than a Bi element, an M element, and an F element. Also, the solid electrolyte material of the present disclosure may contain a Pb element and may not contain a Pb element, but the latter is preferable, so as to allow the solid electrolyte material to have reduced load for the environment. Incidentally, even when the solid electrolyte material of the present disclosure contains a Pb element, if the proportion thereof is small, the load for the environment may be reduced.

Also, in the composition of $Bi_xM_{1-x}F_{2+x}$, the x is 0.4 or more, may be 0.55 or more, and may be 0.6 or more. If the value of x is too small, the proportion of the crystal phase having a Tysonite structure tends to be small. Meanwhile, the x is 0.9 or less, and may be 0.8 or less. In particular, M preferably includes Sn.

The solid electrolyte material of the present disclosure has a crystal phase with a Tysonite structure. This crystal phase is a crystal phase that contains a Bi element, an M element, and an F element. Also, the space group of the crystal phase is typically $P6_3/mmc$. The crystal phase preferably has, in an X-ray diffraction (XRD) measurement using a CuKα ray, $2θ=24.4°±0.5°$, $2θ=24.9°±0.5°$, $2θ=27.7°±0.5°$, $2θ=35.1°±0.5°$, $2θ=43.8°±0.5°$, $2θ=45.1°±0.5°$, $2θ=50.0°±0.5°$, $2θ=50.7°±0.5°$, and $2θ=52.5°±0.5°$. Incidentally, in these peak positions, the crystal lattice may be slightly changed depending on factors such as the material composition, so that the range of ±0.5° is set. The range of each peak position may be ±0.3°, and may be ±0.1°. Incidentally, the space group P-3c1 in the crystal phase with a Tysonite structure such as $LaF_3$ and $CeF_3$ has peaks in the vicinity of $2θ=14.2°$ (such as $14.2°±0.5°$) and in the vicinity of 40.4° (such as $40.4°±0.5°$); however, the crystal group $P6_3/mmc$ usually does not have peaks in these positions.

The solid electrolyte material of the present disclosure preferably has the crystal phase as a main phase. The proportion of the crystal phase (crystal phase with a Tysonite-type structure) to all the crystal phases in the solid electrolyte material is, for example, 50 mol % or more, may be 70 mol % or more, and may be 90 mol % or more. In particular, the solid electrolyte material of the present disclosure preferably has the crystal phase as a single phase. The reason therefor is to allow the solid electrolyte material to have high fluoride ion conductivity.

The solid electrolyte material of the present disclosure preferably has high fluoride ion conductivity. The fluoride ion conductivity of the solid electrolyte material at 25° C. is, for example, preferably $1×10^{-6}$ S/cm or more. Also, the shape of the solid electrolyte material of the present disclosure is not limited, and examples thereof may include a granular shape and a thin film shape. The average particle size ($D_{50}$) of the solid electrolyte material is, for example, preferably in a range of 0.1 μm to 50 μm. Also, the solid electrolyte material of the present disclosure is used in a fluoride ion battery. The details of the fluoride ion battery will be described later.

B. Fluoride Ion Battery

FIG. 1 is a schematic cross-sectional view illustrating an example of the fluoride ion battery of the present disclosure. Fluoride ion battery 10 shown in FIG. 1 comprises cathode layer 1, anode layer 2, solid electrolyte layer 3 formed between cathode layer 1 and anode layer 2, cathode current collector 4 for collecting currents of cathode layer 1, anode current collector 5 for collecting currents of anode layer 2, and battery case 6 for storing these members.

According to the present disclosure, at least one of the cathode layer, the anode layer, and the solid electrolyte layer contains the above described solid electrolyte material, so as to allow a fluoride ion battery to have, for example, high output.

The fluoride ion battery of the present disclosure is hereinafter described in each constitution.

1. Solid Electrolyte Layer

The solid electrolyte layer in the present disclosure is a layer that contains at least a solid electrolyte material. Also, the solid electrolyte layer may contain only the solid electrolyte material, and may further contain a binder.

The solid electrolyte material included in the solid electrolyte layer is not limited if the material has fluoride ion conductivity, but is preferably the material described in "A. Solid electrolyte material" above. In other words, the solid electrolyte layer preferably contains the solid electrolyte material described in "A. Solid electrolyte material" above.

The binder is not limited if it is chemically and electronically stable, and examples thereof may include fluorine-based binders such as polyvinylidene fluoride (PVDF) and polytetra fluoroethylene (PTFE). Also, the thickness of the solid electrolyte layer greatly varies with the constitution of the battery, and thus is not limited.

2. Cathode Layer

The cathode layer in the present disclosure is a layer that contains at least a cathode active material. Also, the cathode layer may further contain at least one of a solid electrolyte material, a conductive material, and a binder other than the cathode active material. Also, the cathode layer preferably contains the solid electrolyte material described in "A. Solid electrolyte material" above.

The cathode active material in the present disclosure is typically an active material of which defluorination occurs upon discharge. Examples of the cathode active material may include a simple substance of metal, an alloy, a metal oxide, and the fluoride of these. Examples of the metal element to be included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, $CuF_x$, Fe, $FeF_x$, Ag, and $AgF_x$. Incidentally, the x is a real number larger than 0. Also, additional examples of the cathode active material may include carbon materials and fluorides thereof. Examples of the carbon material may include graphite, coke, and carbon nanotube. Also, further additional examples of the cathode active material may include polymer materials. Examples of the polymer material may include polyaniline, polypyrrole, polyacetylene, and polythiophene.

The conductive material is not limited if it has the desired electron conductivity, and examples thereof may include carbon materials. Examples of the carbon material may include carbon black such as acetylene black, Ketjen black, furnace black, and thermal black. On the other hand, the binder is not limited if it is chemically and electronically stable, and examples thereof may include fluorine-based binders such as polyvinylidene fluoride (PVDF) and polytetra fluoroethylene (PTFE). Also, the content of the cathode active material in the cathode layer is preferably larger from the viewpoint of the capacity. Also, the thickness of the cathode layer greatly varies with the constitution of the battery, and thus is not limited.

3. Anode Layer

The anode layer in the present disclosure is a layer that contains at least an anode active material. Also, the anode layer may further contain at least one of a conductive material and a binder other than the anode active material. Also, the anode layer preferably contains the solid electrolyte material described in "A. Solid electrolyte material" above.

The anode active material of the present disclosure is typically an active material of which fluorination occurs upon discharge. Also, an arbitrary active material having lower potential than that of the cathode active material may be selected as the anode active material. Thus, the above described cathode active material may be used as the anode active material. Examples of the anode active material may include a simple substance of metal, an alloy, a metal oxide, and the fluoride of these. Examples of the metal element to be included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, Pb, and $PbF_x$. Incidentally, the x is a real number larger than 0. Also, the above described carbon materials and polymer materials may be used as the anode active material.

Regarding the conductive material and the binder, the same materials as those described for the above described cathode layer are applicable. Also, the content of the anode active material in the anode layer is preferably larger from the viewpoint of the capacity. Also, the thickness of the anode layer greatly varies with the constitution of the battery, and thus is not limited.

4. Other Constitution

The fluoride ion battery of the present disclosure comprises at least the above described cathode layer, anode layer, and solid electrolyte layer, and usually further comprises a cathode current collector for collecting currents of the cathode layer, and an anode current collector for collecting currents of the anode layer. Examples of the shape of the current collectors may include a foil shape, a mesh shape, and a porous shape.

5. Fluoride Ion Battery

The fluoride ion battery of the present disclosure may be a primary battery and may be a secondary battery, but preferably a secondary battery among them, so as to be repeatedly charged and discharged and be useful as a car-mounted battery for example. Also, examples of the shape of the fluoride ion battery of the present disclosure may include a coin shape, a laminate shape, a cylindrical shape, and a square shape. Also, the battery case to be used for the fluoride ion battery is not limited.

Incidentally, the present disclosure is not limited to the embodiments. The embodiments are exemplifications, and any other variations are intended to be included in the technical scope of the present disclosure if they have substantially the same constitution as the technical idea described in the claim of the present disclosure, and offer similar operation and effect thereto.

EXAMPLES

Example 1

Powder $BiF_3$ and powder $SnF_2$ were mixed in the molar ratio of $BiF_3:SnF_2=0.9:0.1$. Mechanical milling was conducted for the obtained mixture, using a planetary ball mill at the revolution number of 600 rpm for 12 hours. Thereby, a solid electrolyte material represented by $Bi_{0.9}Sn_{0.1}F_{2.9}$ was obtained. This composition corresponds to x=0.9 in $Bi_xSn_{1-x}F_{2+x}$.

Examples 2 to 6

A solid electrolyte material was obtained in the same manner as in Example 1, except that the x in $Bi_xSn_{1-x}F_{2+x}$ was respectively changed to x=0.8, x=0.7, x=0.6, x=0.5, and x=0.4.

Comparative Examples 1 and 2

Powder $SnF_2$ and powder $BiF_3$ were respectively used as a sample for comparison. Incidentally, the both respectively corresponds to x=0 and x=1 in $Bi_xSn_{1-x}F_{2+x}$.

[Evaluation]

XRD Measurement

Figure 2:
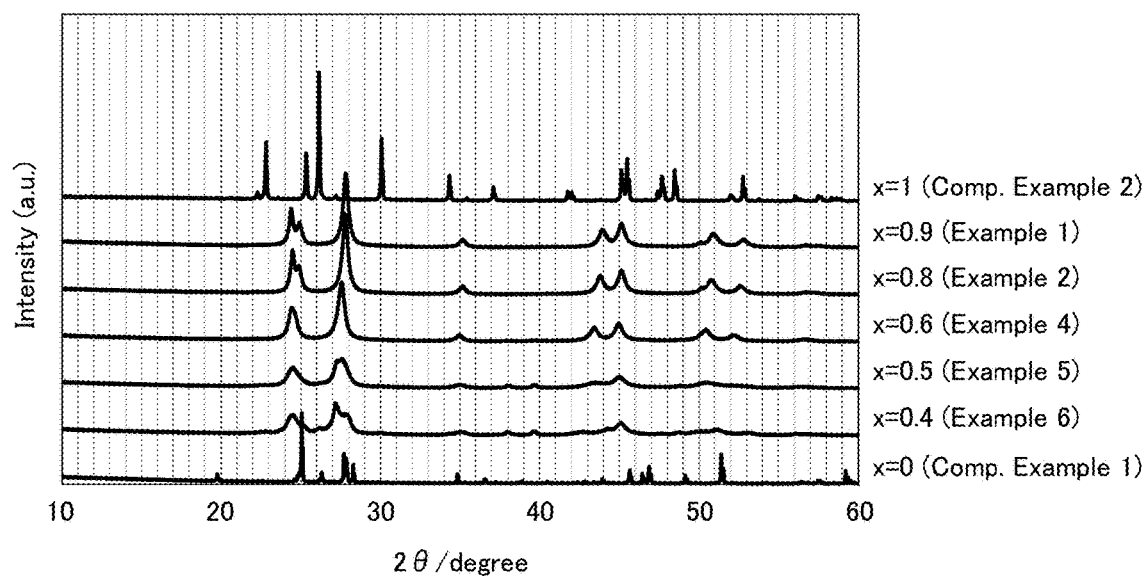
FIG. 2 is the result of an XRD measurement for the solid electrolyte material obtained in Examples 1, 2, 4 to 6, and Comparative Examples 1 and 2.

A powder X-ray diffraction measurement (powder XRD measurement) was conducted for the solid electrolyte material obtained in Examples 1, 2, 4 to 6, and Comparative Examples 1 and 2. In particular, the measurement was conducted in the range of 2θ=10° to 60° using a CuKα ray. The result is shown in FIG. 2. As shown in FIG. 2, in Example 1, the peaks of the crystal phase with a Tysonite-type structure belonging to the space group P6₃/mmc appeared in the vicinity of 2θ=24.4°, in the vicinity of 2θ=24.9°, in the vicinity of 2θ=27.7°, in the vicinity of 2θ=35.1°, in the vicinity of 2θ=43.8°, in the vicinity of 2θ=45.1°, in the vicinity of 2θ=50.0°, in the vicinity of 2θ=50.7°, and in the vicinity of 2θ=52.5°. The similar peaks to those in Example 1 were also obtained in Examples 2 and 4. In this manner, the crystal phase with a Tysonite-type structure was obtained in almost a single phase in Examples 1, 2, and 4. On the other hand, in Examples 5 and 6, although the peaks of the crystal phase with a Tysonite-type structure appeared similarly to Examples 1, 2, and 4, the peak of $SnF_2$ also appeared. Incidentally, in Comparative Examples 1 and 2, the peak of powder $SnF_2$ and the peak of powder $BiF_3$ respectively appeared in a single phase.

Fluoride Ion Conductivity Measurement

A fluoride ion conductivity measurement by an alternating current impedance method was conducted for the solid electrolyte material obtained in Examples 1 to 6 and Comparative Examples 1 and 2. A measurement cell was prepared as follows. First, the solid electrolyte material (powder) of 200 mg was put in a ceramic cylinder made of macole and uniaxial-pressure-molded at 1 ton/cm² so as to be molded in a pellet shape. After that, acetylene black (current collector) was stacked on both surfaces of the pellet, and pressed at the pressure of 4 ton/cm$^2$. The laminated body after pressing was confined with a bolt by torque of 6N·m. Thereby, the measurement cell was obtained.

Figure 3:
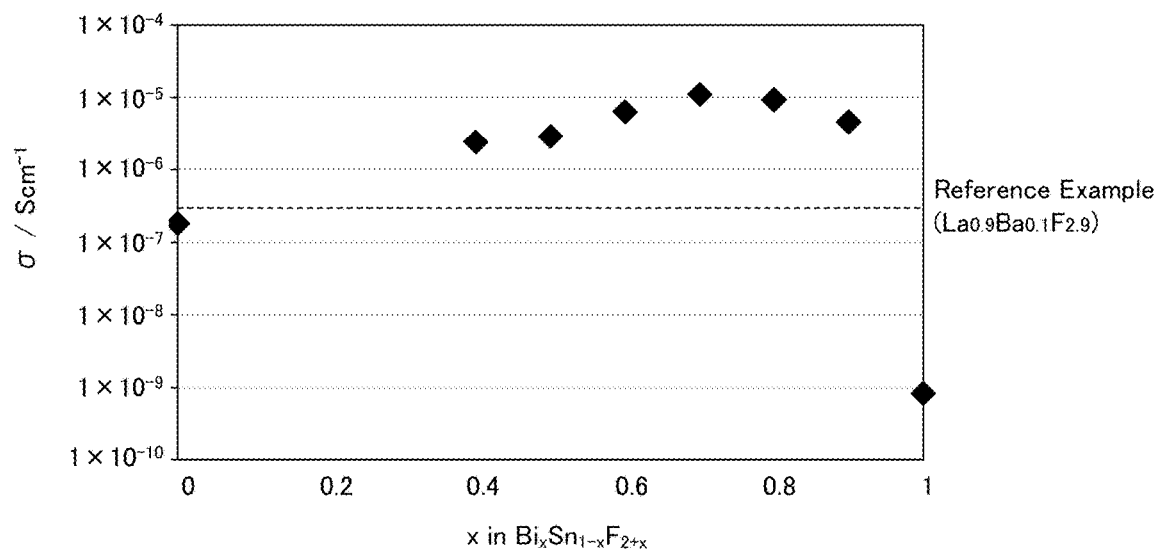
FIG. 3 is the result of a fluoride ion conductivity measurement for the solid electrolyte material obtained in Examples 1 to 6 and Comparative Examples 1 and 2, which shows the fluoride ion conductivity at a room temperature.

The measurement environment was under a vacuum of 10$^{-1}$ Pa, at a room temperature (28° C.), 60° C., 100° C., 150° C., and 200° C. Also, in the impedance measurement, the frequency was 10$^6$ Hz to 10$^{-2}$ Hz, and the voltage magnitude was 50 mA. The result of the measurement at a room temperature (28° C.) is shown in FIG. 3 and Table 1. Also, the temperature dependency of the fluoride ion conductivity (Arrhenius plot) is shown in FIG. 4.

TABLE 1

| | $x$ in $Bi_xSn_{1-x}F_{2+x}$ | Fluoride ion conductivity σ S/cm |
|---|---|---|
| Example 1 | 0.9 | $4.6 \times 10^{-6}$ |
| Example 2 | 0.8 | $9.3 \times 10^{-6}$ |
| Example 3 | 0.7 | $1.1 \times 10^{-5}$ |
| Example 4 | 0.6 | $6.3 \times 10^{-6}$ |
| Example 5 | 0.5 | $2.9 \times 10^{-6}$ |
| Example 6 | 0.4 | $2.4 \times 10^{-6}$ |
| Comparative Example 1 | 0 | $1.8 \times 10^{-7}$ |
| Comparative Example 2 | 1 | $8.3 \times 10^{-10}$ |

Figure 4:
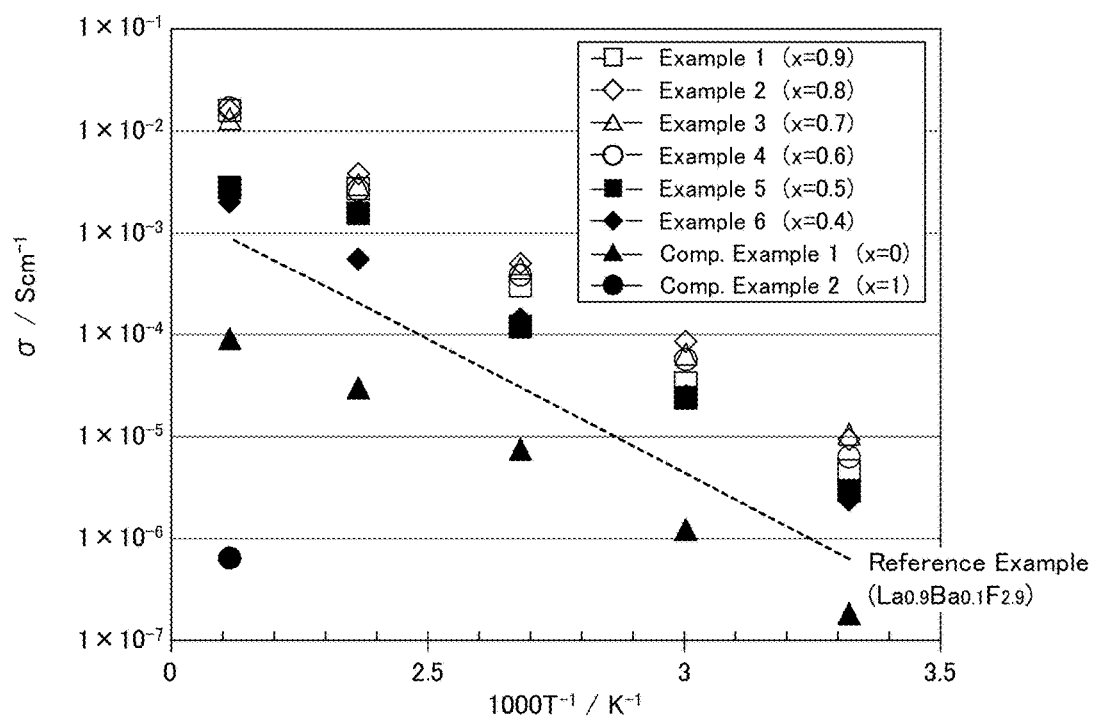
FIG. 4 is the result of a fluoride ion conductivity measurement for the solid electrolyte material obtained in Examples 1 to 6 and Comparative Examples 1 and 2, which shows the temperature dependency of the fluoride ion conductivity.

As shown in Table 1, FIG. 3, and FIG. 4, in Examples 1 to 4 (0.6≤x≤0.9) in which the crystal phase with a Tysonite-type structure was obtained in almost a single phase, high fluoride ion conductivity was obtained. On the other hand, in Examples 5 and 6 (0.4≤x≤0.5) in which the crystal phase with a Tysonite-type structure and the crystal phase of SnF$_2$ were obtained, although the fluoride ion conductivity was lower than those of Examples 1 to 4, higher fluoride ion conductivity than those of Comparative Examples 1 and 2 was obtained.

Also, as disclosed in Non-Patent Literature 1, as a pressurized powder body of a solid electrolyte material having a Tysonite-type structure, the pressurized powder body of $La_{0.9}Ba_{0.1}F_{2.9}$ has been known to show high ion conductivity. Reference Example was when $La_{0.2}Ba_{0.1}F_{2.9}$ was used; a measurement cell was produced in the same manner as in Example 1 and the fluoride ion conductivity was measured. As the result, the fluoride ion conductivity at a room temperature was 3×10$^7$ S/cm. As shown in FIG. 3 and FIG. 4, Examples 1 to 6 showed the fluoride ion conductivity approximately 1 digit (approximately 10 times) higher than that of Reference Example.

Figure 5A:
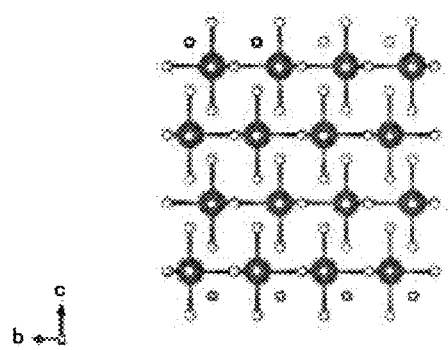
FIGS. 5A and 5B are schematic diagrams explaining the symmetry of the crystal structure.
Figure 5A:
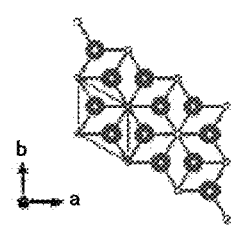
Figure 5B:
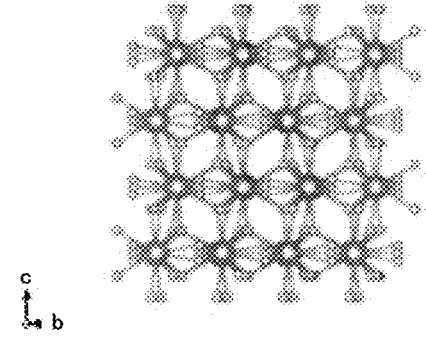
Figure 5B:
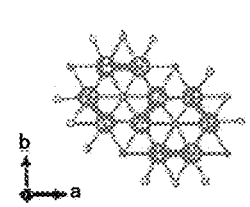

The space group of the crystal phase with a Tysonite-type structure obtained in Examples 1 to 6 was P6$_3$/mmc, which differed from that of BiF$_3$ (space group Pnma) and from that of SnF$_2$ (space group C2/c). Also, as shown in FIGS. 5A and 5B, the space group (P6$_3$/mmc) of the crystal phase with a Tysonite-type structure obtained in Examples 1 to 6 also differed from the space group (P-3c1) of the crystal phase with a Tysonite-structure such as LaF$_3$ and CeF$_3$. In more particular, the space group P6$_3$/mmc has higher symmetry in the fluoride ion site than that of the space group P-3c1. In the space group P-3c1, fluoride ions are divided into the site that is potentially stable and the site that is potentially unstable, so that the hopping barrier of the fluoride ions in the stable site becomes high; as the result, the fluoride ion conductivity presumably decreases. In contrast, in the space group P6$_3$/mmc, symmetry in the fluoride ion site is high, and the fluoride ions are not divided into the site that is potentially stable and the site that is potentially unstable, so that the fluoride ions can hop, but not be kept in a specific site; as the result, the fluoride ion conductivity presumably increases. Incidentally, the fluoride ion conductivity of LaF$_3$ is approximately 7×10$^{-9}$ S/cm.

Examples 7 to 10

A solid electrolyte material ($Bi_{0.1}M_{0.1}F_{2.9}$; M=Ca, Sr, Ba, or Pb, respectively) was obtained in the same manner as in Example 1, except that powder CaF$_2$, powder SrF$_2$, powder BaF$_2$, or powder PbF$_2$ was respectively used instead of the powder SnF$_2$.

Comparative Example 3

A solid electrolyte material ($Bi_{0.1}Mg_{0.1}F_{2.9}$) was obtained in the same manner as in Example 1, except that powder MgF$_2$ was used instead of the powder SnF$_2$.

[Evaluation]
XRD Measurement

Figure 6:
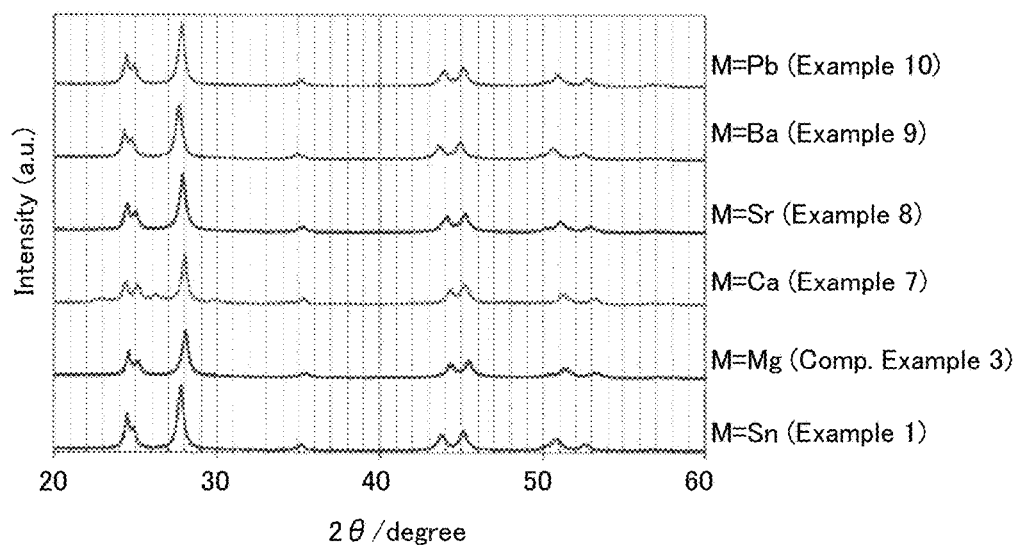
FIG. 6 is the result of an XRD measurement for the solid electrolyte material obtained in Examples 1, 7 to 10, and Comparative Example 3.

A powder X-ray diffraction measurement (powder XRD measurement) was conducted for the solid electrolyte material obtained in Examples 7 to 10 and Comparative Example 3. In particular, the measurement was conducted in the range of 2θ=20° to 60° using a CuKα ray. The result is shown in FIG. 6. As shown in FIG. 6, in Examples 7 to 10 and Comparative Example 3, similar peaks to those of Example 1 were obtained. Incidentally, in Example 7, the peak of BiF$_3$ was very slightly confirmed, but the crystal phase of a Tysonite-type structure was the main phase. Meanwhile, in Examples 8 to 10, the crystal phase of a Tysonite-type structure was obtained in almost a single phase.

Fluoride Ion Conductivity Measurement

Figure 7:
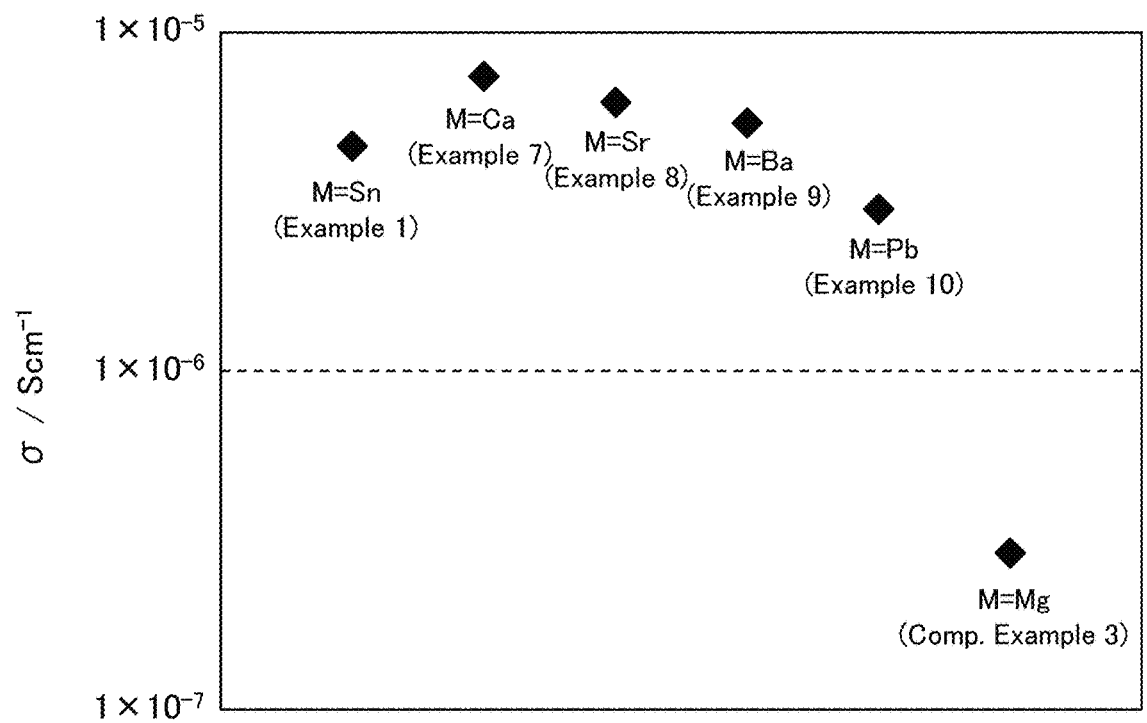
FIG. 7 is the result of a fluoride ion conductivity measurement for the solid electrolyte material obtained in Examples 1, 7 to 10 and Comparative Example 3, which shows the fluoride ion conductivity at a room temperature.

A fluoride ion conductivity measurement by an alternating current impedance method was conducted for the solid electrolyte material obtained in Examples 7 to 10 and Comparative Example 3. The method for the measurement was the same as that described above. The result of the measurement at a room temperature (28° C.) is shown in FIG. 7 and Table 2. Also, the temperature dependency of the fluoride ion conductivity (Arrhenius plot) is shown in FIG. 8.

TABLE 2

| | Composition | Fluoride ion Conductivity σ S/cm |
|---|---|---|
| Example 1 | $Bi_{0.9}Sn_{0.1}F_{2.9}$ | $4.6 \times 10^{-6}$ |
| Example 7 | $Bi_{0.9}Ca_{0.1}F_{2.9}$ | $7.4 \times 10^{-6}$ |
| Example 8 | $Bi_{0.9}Sr_{0.1}F_{2.9}$ | $6.2 \times 10^{-6}$ |
| Example 9 | $Bi_{0.9}Ba_{0.1}F_{2.9}$ | $5.4 \times 10^{-6}$ |
| Example 10 | $Bi_{0.9}Pb_{0.1}F_{2.9}$ | $3.0 \times 10^{-6}$ |
| Comparative Example 3 | $Bi_{0.9}Mg_{0.1}F_{2.9}$ | $2.9 \times 10^{-7}$ |

Figure 8:
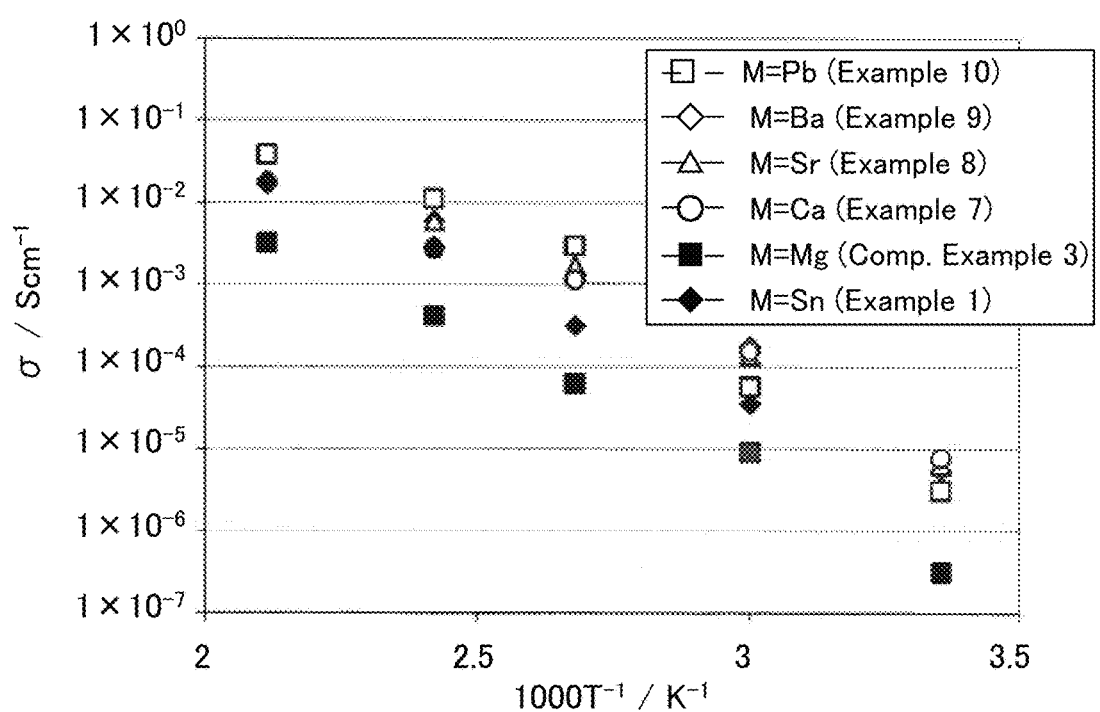
FIG. 8 is the result of a fluoride ion conductivity measurement for the solid electrolyte material obtained in Examples 1, 7 to 10, and Comparative Example 3, which shows the temperature dependency of the fluoride ion conductivity.

As shown in Table 2, FIG. 7 and FIG. 8, in Examples 7 to 10, high fluoride ion conductivity of 10$^{-6}$ S/cm was obtained at a room temperature similarly to Example 1. On the other hand, although the solid electrolyte material obtained in Comparative Example 3 had the crystal phase with a Tysonite-type structure, the fluoride ion conductivity at a room temperature was 2.9×10$^7$ S/cm, which was approximately 1 digit lower than those in Examples 7 to 10. Mg$^{2+}$ has small ionic radius, and forms strong ionic bond with F. Thus, the carrier F was trapped around Mg$^{2+}$, and as the result, the fluoride ion conductivity was presumably decreased.

REFERENCE SIGNS LIST

1 cathode layer
2 anode layer 3 solid electrolyte layer
4 cathode current collector
5 anode current collector
6 battery case
10 fluoride ion battery

What is claimed is:

1. A solid electrolyte material to be used for a fluoride ion battery, the solid electrolyte material comprising:
    a composition of $Bi_xM_{1-x}F_{2+x}$, in which $0.4 \leq x \leq 0.9$, and M is at least one kind of Sn, Ca, Sr, Ba, and Pb; and
    a crystal phase that has a tysonite structure with a $P6_3/mmc$ spce group.

2. A solid electrolyte material to be use for a fluoride ion batter, the solid electrolyte material comprising:
    a composition of $Bi_xM_{1-x}F_{2+x}$, in which x satisfies $0.6 \leq x \leq 0.9$, and M is at least one kind of Sn, Ca, Sr, Ba, and Pb; and
    a crystal phase that has a tysonite structure.

3. A fluoride ion battery comprising: a cathode layer, an anode layer, and a solid electrolyte layer formed between the cathode layer and the anode layer; wherein
    at least one of the cathode layer, the anode layer, or the solid electrolyte layer contains the solid electrolyte material according to claim 1.

4. A fluoride ion battery comprising: a cathode layer, an anode layer, and a solid electrolyte layer formed between the cathode layer and the anode layer; wherein
    at least one of the cathode layer, the anode layer, or the solid electrolyte layer contains the solid electrolyte material according to claim 2.

* * * * *